US007012603B2

(12) United States Patent
Chen et al.

(10) Patent No.: US 7,012,603 B2
(45) Date of Patent: Mar. 14, 2006

(54) MOTION ARTIFACT DETECTION AND CORRECTION

(75) Inventors: Dongqing Chen, Port Jefferson Station, NY (US); Ingmar Bitter, Stony Brook, NY (US)

(73) Assignee: Viatronix Incorporated, Stony Brook, NY (US)

( * ) Notice: Subject to any disclaimer, the term of this patent is extended or adjusted under 35 U.S.C. 154(b) by 409 days.

(21) Appl. No.: 10/301,036

(22) Filed: Nov. 21, 2002

(65) Prior Publication Data

US 2003/0122824 A1 Jul. 3, 2003

Related U.S. Application Data

(60) Provisional application No. 60/331,714, filed on Nov. 21, 2001.

(51) Int. Cl.
*G06T 15/00* (2006.01)

(52) U.S. Cl. .............................. 345/419; 378/8; 378/62

(58) Field of Classification Search ................. 345/419; 378/8, 62
See application file for complete search history.

(56) References Cited

U.S. PATENT DOCUMENTS 5,602,891 A * 2/1997 Pearlman ..................... 378/62
5,839,440 A * 11/1998 Liou et al. .................. 600/431
6,215,841 B1 * 4/2001 Hsieh ............................ 378/8

OTHER PUBLICATIONS

"Automatic Correction of Motion Artifacts in Magnetic Resonance Images Using an Entropy Focus Criterion", Atkinson et. al., IEEE Transactions on Medical Imaging, vol. 16, No. 6, Dec. 1997, 0278–0062/97.*
"Reduction of Patient Motion Artifacts in Digital Subtraction Angiography: Evaluation of a Fast and Fully Automatic Technique", Meijering et al., Radiology, vol. 219, No. 1, Apr. 2001, pp. 288–293.*
"Respiratory Compensation in Projection Imaging Using a Magnification and Displacement Model", Crawford et. al., IEEE Transactions on Medical Imaging, vol. 15, No. 3, Jun. 1996, 0278–0062/96.*
"Virtual Voyage: Interactive Navigation in the Human Colon", Hong et al., 1997, ISBN:0–99791–896–7.*

* cited by examiner

*Primary Examiner*—Almis R. Jankus
*Assistant Examiner*—Jon Hadidi
(74) *Attorney, Agent, or Firm*—F. Chau & Associates, LLC

(57) ABSTRACT

An apparatus and method are provided for motion artifact detection and correction, where an apparatus includes a scanning device for receiving two-dimensional image slices of an object, a rendering device in signal communication with the scanning device for rendering a three-dimensional volume representation of the two-dimensional image slices, and a correction device in signal communication with the rendering device for correcting motion artifacts within the three-dimensional volume representation; and a corresponding method for detecting motion artifacts within scan data of a region comprising an object includes creating a three-dimensional representation with volume elements of the region based on the scan data, analyzing the volume elements along a boundary of the object, and determining the existence of a motion artifact in response to the analyzing.

33 Claims, 8 Drawing Sheets

MOTION ARTIFACT DETECTION AND CORRECTION

CROSS-REFERENCE

This application claims the benefit of U.S. Provisional Patent Application Ser. No. 60/331,714, entitled "CT Movement Detection Method" and filed Nov. 21, 2001, which is incorporated herein by reference in its entirety.

BACKGROUND

The present disclosure relates to volume based three-dimensional virtual examinations, and more particularly relates to a system and method for detection and correction of motion artifacts introduced during scanning.

Two-dimensional ("2D") visualization of human organs using medical imaging devices has been widely used for patient diagnosis. Currently available medical imaging devices include computed tomography ("CT") and magnetic resonance imaging ("MRI"), for example. Three-dimensional ("3D") images can be formed by stacking and interpolating between two-dimensional pictures produced from the scanning machines. Imaging an organ and visualizing its volume in three-dimensional space would be beneficial due to the lack of physical intrusion and the ease of data manipulation. However, the exploration of the three-dimensional volume image must be properly performed in order to fully exploit the advantages of virtually viewing an organ from the inside.

Although the scanning speeds of modern MRI, CT scanners and like equipment are an improvement over earlier technologies, they generally remain slow enough that patient movement during a scan can cause blurring of a boundary formed by the tissue of the patient and the background of the scanning equipment. This blurring is usually referred to as "motion artifact". Accordingly, it is desirable to provide a scanning system and method capable of detecting and correcting these motion artifacts.

SUMMARY

These and other drawbacks and disadvantages of the prior art are addressed by a system and method for motion artifact detection and correction. An apparatus and method are provided for motion artifact detection and correction, where an apparatus includes a scanning device for receiving two-dimensional image slices of an object, a rendering device in signal communication with the scanning device for rendering a three-dimensional volume representation of the two-dimensional image slices, and a correction device in signal communication with the rendering device for correcting motion artifacts within the three-dimensional volume representation.

A corresponding method for detecting motion artifacts within scan data of a region comprising an object includes creating a three-dimensional representation with volume elements of the region based on the scan data, analyzing the volume elements along a boundary of the object, and determining the existence of a motion artifact in response to the analyzing.

Accordingly, an aspect of the present disclosure relates to a method for detecting motion artifacts within scan data of a region including an object from a radiological scanning device. According to this aspect, a three-dimensional representation of the region based on the scan data is created. From among the volume elements of the three-dimensional representation, the one or more volume elements along a boundary of the object are analyzed to determine if one or more motion artifacts exist within the three-dimensional representation. An exemplary region would be the field of view of a CT scanning device with an exemplary object being a patient's abdomen. Motion artifacts can include both breathing motion and body-shift.

These and other aspects, features and advantages of the present disclosure will become apparent from the following description of exemplary embodiments, which is to be read in connection with the accompanying drawings.

BRIEF DESCRIPTION OF THE DRAWINGS

Further objects, features and advantages of the present disclosure will become more apparent from the following detailed description of preferred embodiments, taken in conjunction with the accompanying Figures, in which.

DETAILED DESCRIPTION OF PREFERRED EMBODIMENTS

A system and method are provided for generating a three-dimensional ("3D") visualization image of an object, such as an organ, using volume visualization techniques, where the resulting visualization is suitable for use with a guided navigational system. A guided navigational system allows the operator to travel along a flight path and to adjust the view to a particular portion of the image of interest in order, for example, to identify polyps, cysts or other abnormal features in the visualized organ. One or more bisecting profiles are acquired along the sagittal and corollary plane. These profiles are then analyzed to determine whether a patient has moved during the scan. Additionally, the profiles can be used to estimate the amount of patient movement and thereby enable corresponding correction of the scan data to remove any false artifacts resulting from the movement.

While the methods and systems described herein may be applied to any object to be examined, preferred embodiments include the examination of an organ in the human body, such as the colon, for example. The colon is long and twisted, which makes it especially suited for a virtual examination, saving the patient the money, discomfort and danger of a physical probe. Other examples of organs or systems that can be virtually examined include the lungs, stomach and portions of the gastrointestinal system, and the heart and blood vessels.

Figure 1:
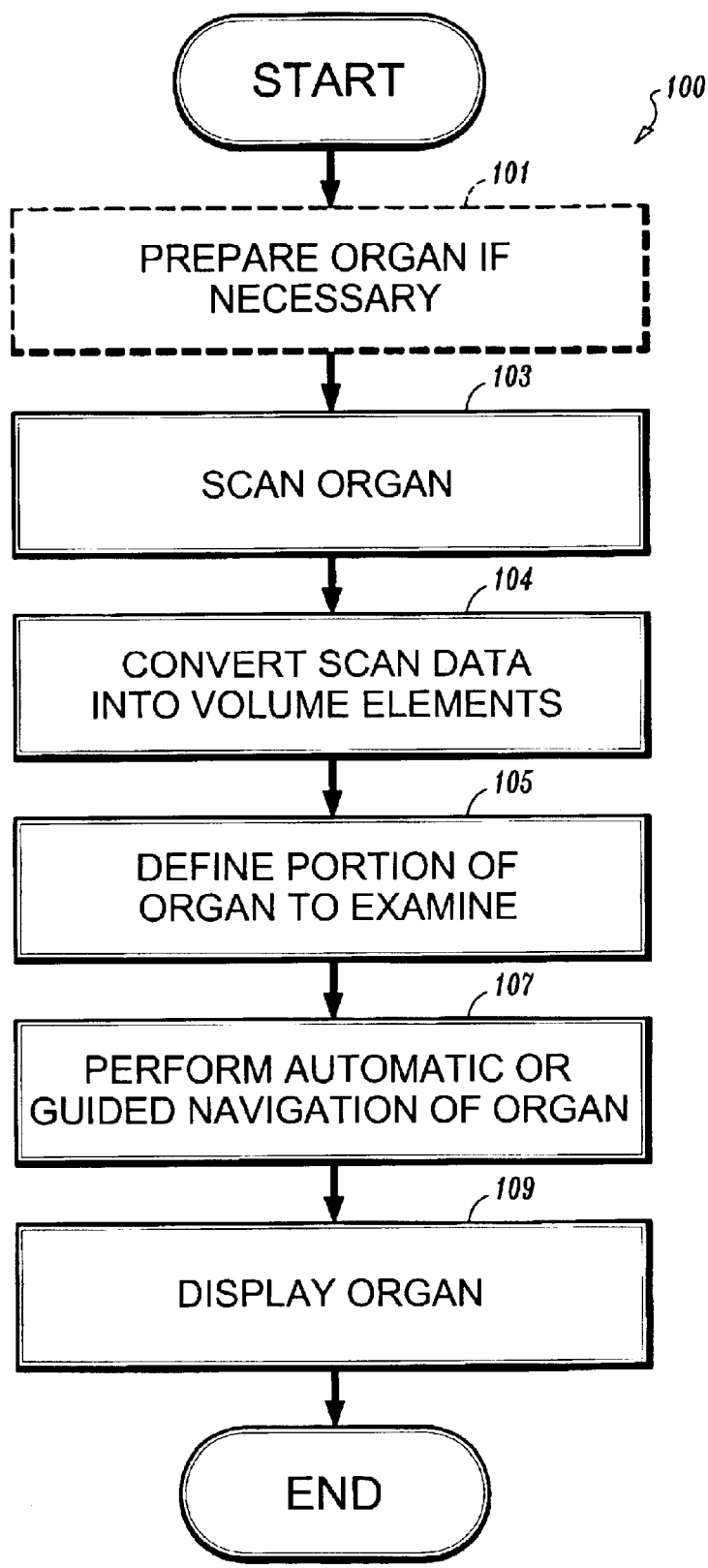
FIG. 1 shows a flow chart of the steps for performing a virtual examination of an object, specifically a colon, in accordance with the disclosure.

As shown in FIG. 1, a method for performing a virtual examination of an object such as a colon is indicated generally by the reference numeral 100. The method 100 illustrates the steps necessary to perform a virtual colonoscopy using volume visualization techniques. Step 101 prepares the colon to be scanned in order to be viewed for examination if required by either the doctor or the particular scanning instrument. This preparation could include cleansing the colon with a "cocktail" or liquid, which enters the colon after being orally ingested and passed through the stomach. The cocktail forces the patient to expel waste material that is present in the colon. One example of a substance used is Golytcly. Additionally, in the case of the colon, air or carbon dioxide can be forced into the colon in order to expand it to make the colon easier to scan and examine. This is accomplished with a small tube placed in the rectum with approximately 1,000 cc of air pumped into the colon to distend the colon. Depending upon the type of scanner used, it may be necessary for the patient to drink a contrast substance such as barium to coat any unexpunged stool in order to distinguish the waste in the colon from the colon walls themselves. Alternatively, the method for virtually examining the colon can remove the virtual waste prior to or during the virtual examination as explained later in this specification. Step 101 does not need to be performed in all examinations as indicated by the dashed line in FIG. 1.

Step 103 scans the organ that is to be examined. The scanner can be an apparatus well known in the art, such as a spiral CT-scanner for scanning a colon or a Zenith MRI machine for scanning a lung labeled with xenon gas, for example. The scanner must be able to take multiple images from different positions around the body during suspended respiration, in order to produce the data necessary for the volume Visualization. For example, data can be acquired using a GE/CTI spiral mode scanner operating in a helical mode of 5 mm, 1.5–2.0:1 pitch, reconstructed in 1 mm slices, where the pitch is adjusted based upon the patient's height in a known manner. A routine imaging protocol of 120 kVp and 200–280 ma can be utilized for this operation. The data can be acquired and reconstructed as 1 mm thick slice images having an array size of 512×512 pixels in the field of view, which varies from 34 to 40 cm depending on the patient's size. The number of such slices generally varies under these conditions from 300 to 450, depending on the patient's height. The image data set is converted to volume elements or voxels.

An example of a single CT-image would use an X-ray beam of 5 mm width, 1:1 to 2:1 pitch, with a 40 cm field-of-view being performed from the top of the splenic flexure of the colon to the rectum.

Discrete data representations of the object can be produced by other methods besides scanning. Voxel data representing an object can be derived from a geometric model by techniques described in U.S. Pat. No. 5,038,302 entitled "Method of Connecting Continuous Three-Dimensional Geometrical Representations into Discrete Three-Dimensional Voxel-Based Representations Within a Three-Dimensional Voxel-Based System" by Kaufman, issued Aug. 8, 1991, filed Jul. 26, 1988, which is hereby incorporated by reference in its entirety. Additionally, data can be produced by a computer model of an image, which can be converted to three-dimensional voxels and explored in accordance with this disclosure.

Step 104 converts the scanned images into three-dimensional volume elements ("voxels"). In a preferred embodiment for examining a colon, the scan data is reformatted into 5 mm thick slices at increments of 1 mm or 2.5 mm and reconstructed in 1 mm slices, with each slice represented as a matrix of 512 by 512 pixels. By doing this, voxels of approximately 1 cubic mm are created. Thus a large number of 2D slices are generated depending upon the length of the scan. The set of 2D slices is then reconstructed to 3D voxels. The conversion process of 2D images from the scanner into 3D voxels can either be performed by the scanning machine itself or by a separate machine such as a computer implementing techniques that are well known in the art (see, e.g., U.S. Pat. No. 4,985,856 entitled "Method and Apparatus for Storing, Accessing, and Processing Voxel-based Data" by Kaufman et al.; issued Jan. 15, 1991, filed Nov. 11, 1988; which is hereby incorporated by reference in its entirety).

Step 105 allows the operator to define the portion of the selected organ to be examined. A physician may be interested in a particular section of the colon likely to develop polyps. The physician can view a two dimensional slice overview map to indicate the section to be examined. A starting point and finishing point of a path to be viewed can be indicated by the physician/operator. A conventional computer and computer interface (e.g., keyboard, mouse or spaceball) can be used to designate the portion of the colon that is to be inspected. A grid system with coordinates can be used for keyboard entry or the physician/operator can "click" on the desired points. The entire image of the colon can also be viewed if desired.

Step 107 performs the planned or guided navigation operation of the virtual organ being examined. Performing a guided navigation operation is defined as navigating through an environment along a predefined or automatically predetermined flight path, which can be manually adjusted by an operator at any time. After the scan data has been converted to 3D voxels, the inside of the organ is traversed from the selected start to the selected finishing point. The virtual examination is modeled on having a tiny viewpoint or "camera" traveling through the virtual space with a view direction or "lens" pointing towards the finishing point. The guided navigation technique provides a level of interaction with the camera, so that the camera can navigate through a virtual environment automatically in the case of no operator interaction, and at the same time, allow the operator to manipulate the camera when necessary. The preferred embodiment of achieving guided navigation is to use a physically based camera model that employs potential fields to control the movement of the camera, as is further detailed with respect to FIGS. 2 and 3.

Step 109, which can be performed concurrently with step 107, displays the inside of the organ from the viewpoint of the camera model along the selected pathway of the guided navigation operation. Three-dimensional displays can be generated using techniques well known in the art such as the marching cubes technique, for example. In order to produce a real time display of the colon, a technique is used that reduces the vast number of data computations necessary for the display of the virtual organ.

The method described in FIG. 1 may also be applied to scanning multiple organs in a body at the same time. For example, a patient may be examined for cancerous growths in both the colon and lungs. The method of FIG. 1 would be modified to scan all the areas of interest in step 103 and to select the current organ to be examined in step 105. For example the physician/operator may initially select the colon to virtually explore and later explore the lung. Alternatively, two different doctors with different specialties may virtually explore different scanned organs relating to their respective specialties. Following step 109, the next organ to be examined is selected and its portion will be defined and explored. This continues until all organs that need examination have been processed.

The steps described in conjunction with FIG. 1 may also be applied to the exploration of any object that can be represented by volume elements. For example, an architectural structure or inanimate object can be represented and explored in the same manner.

Figure 2:
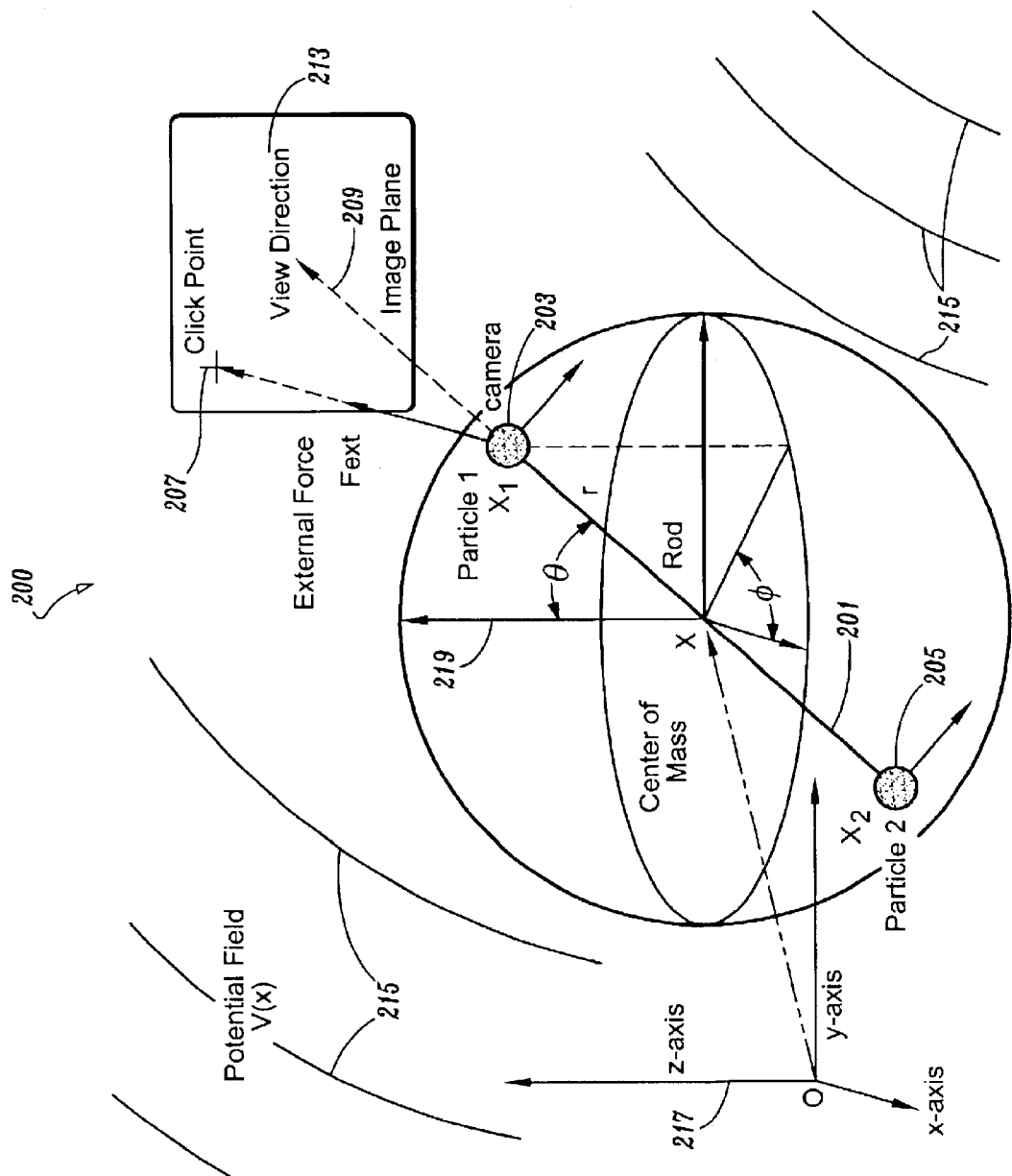
FIG. 2 shows an illustration of a "submarine" camera model which performs guided navigation in the virtual organ.

Turning to FIG. 2, a "submarine camera" model that performs guided navigation in a virtual organ is indicated generally by the reference numeral 200. The model 200 depicts a viewpoint control model that performs the guided navigation technique of step 107. When there is no operator control during guided navigation, the default navigation is similar to that of planned navigation that automatically directs the camera along a flight path from one selected end of the colon to another. During the planned navigation phase, the camera stays at the center of the colon for obtaining better views of the colonic surface. When an interesting region is encountered, the operator of the virtual camera using guided navigation can interactively bring the camera close to a specific region and direct the motion and angle of the camera to study the interesting area in detail, without unwillingly colliding with the walls of the colon. The operator can control the camera with a standard interface device such as a keyboard, mouse or nonstandard device such as a spaceball. In order to fully operate a camera in a virtual environment, six degrees of freedom for the camera are required. The camera must be able to move in the horizontal, vertical, and depth or Z direction (axes 217), as well as being able to rotate in another three degrees of freedom (axes 219) to allow the camera to move and scan all sides and angles of a virtual environment.

Methods for computing a centerline inside the area of interest are well known in the art (see, e.g., U.S. Pat. No. 5,971,767 entitled "SYSTEM AND METHOD FOR PERFORMING A THREE-DIMENSIONAL VIRTUAL EXAMINATION" by Kaufman et al.; issued Oct. 26, 1999 and incorporated by reference herein in its entirety).

Figure 3:
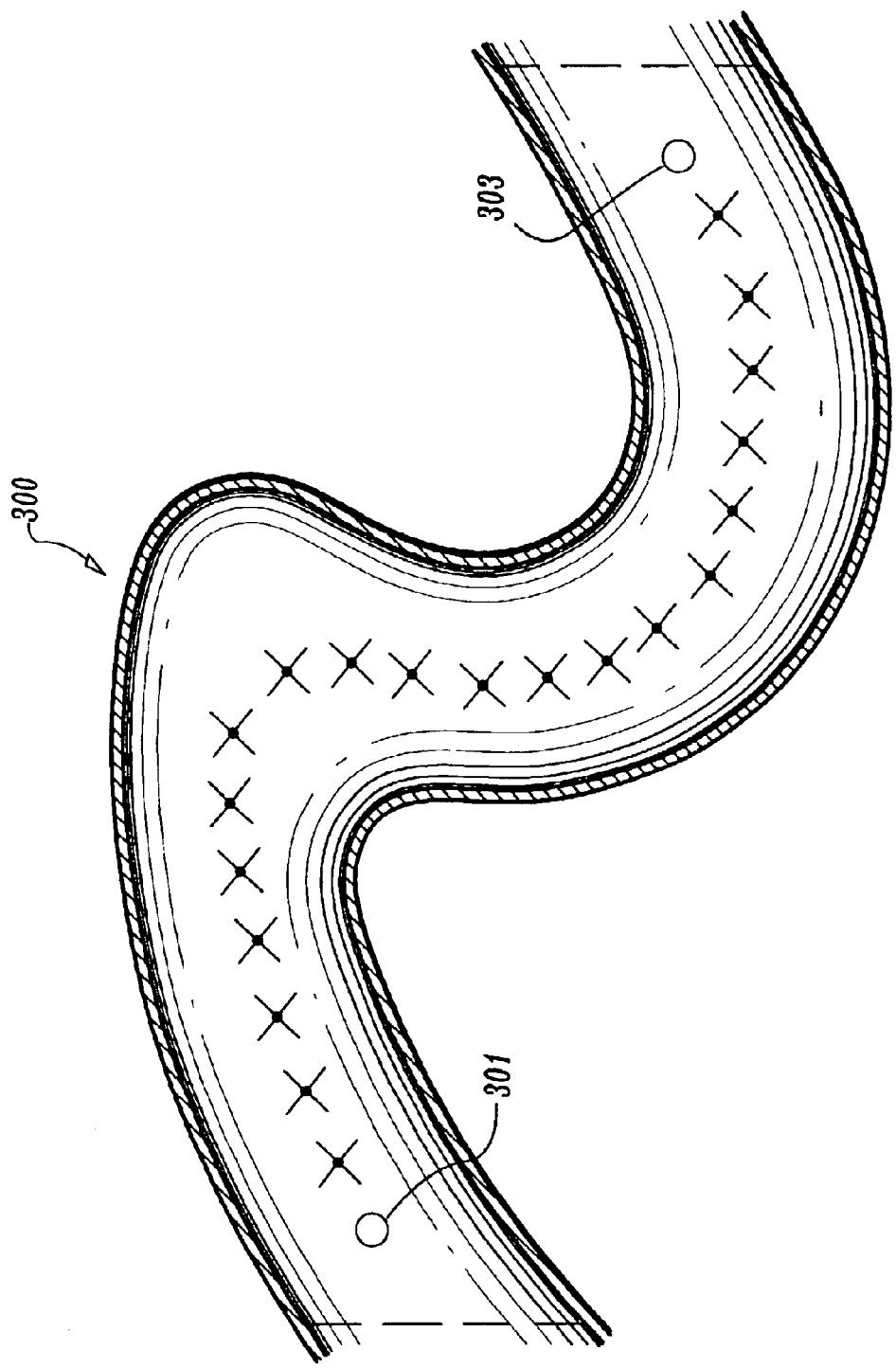
FIG. 3 shows a diagram illustrating a two dimensional cross-section of a volumetric colon which contains the flight path.

Referring to FIG. 3, a two dimensional cross-section of a volumetric colon containing a flight path is indicated generally by the reference numeral 300. The cross-section 300 includes the final flight path for the camera model down the center of the colon, as indicated by "x"s, and at least one starting location 301 or 303 near one end of the colon.

Figure 4:
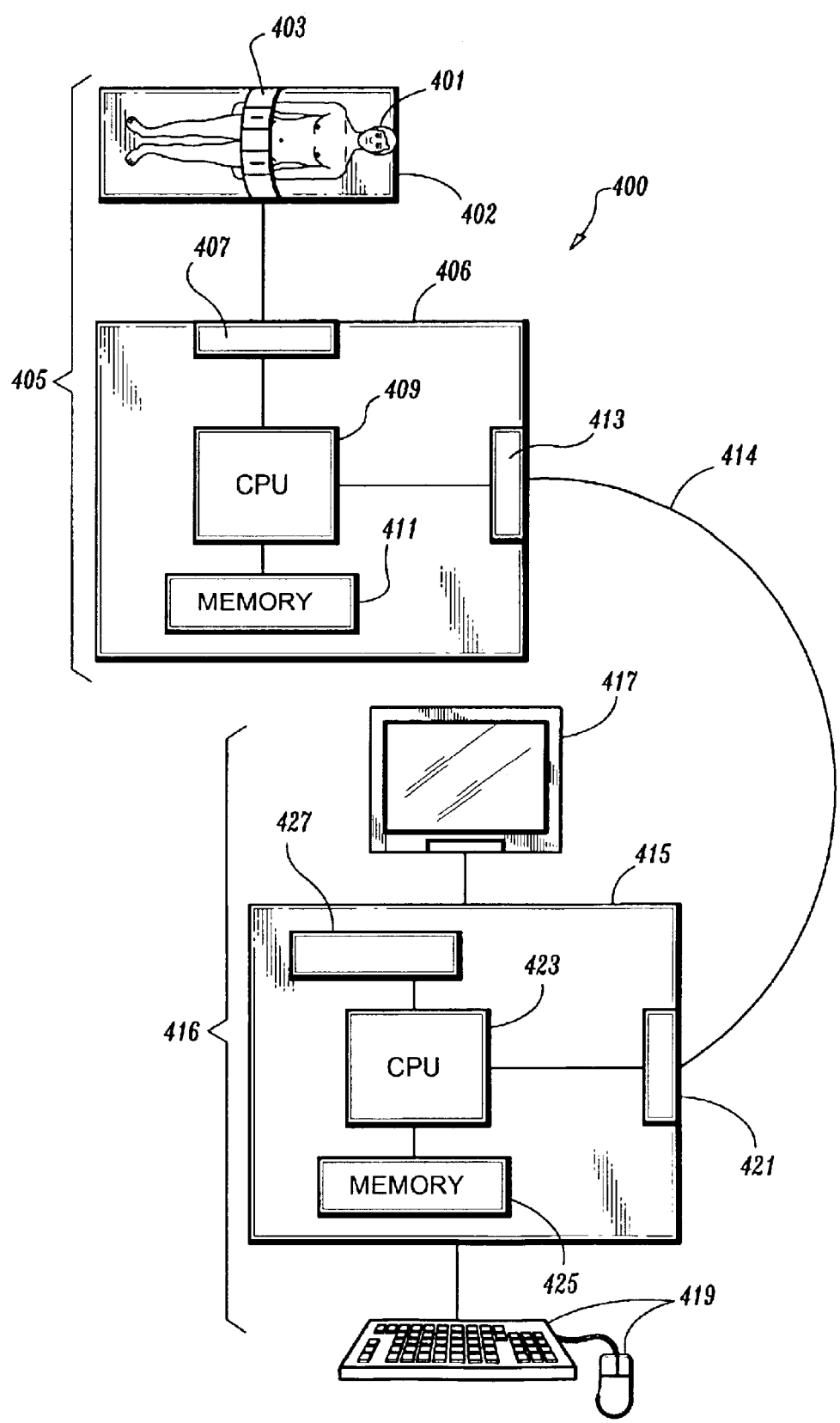
FIG. 4 shows a diagram of a system used to perform a virtual examination of a human organ in accordance with the disclosure.

Turning now to FIG. 4, a system used to perform a virtual examination of a human organ in accordance with the disclosure is indicated generally by the reference numeral 400. The system 400 is for performing the virtual examination of an object such as a human organ using the techniques described herein. A patient 401 lays on a platform 402, while a scanning device 405 scans the area that contains the organ or organs to be examined. The scanning device 405 contains a scanning portion 403 that takes images of the patient and an electronics portion 406. The electronics portion 406 includes an interface 407, a central processing unit 409, a memory 411 for temporarily storing the scanning data, and a second interface 413 for sending data to a virtual navigation platform or terminal 416. The interfaces 407 and 413 may be included in a single interface component or may be the same component. The components in the portion 406 are connected together with conventional connectors.

In the system 400, the data provided from the scanning portion 403 of the device 405 is transferred to unit 409 for processing and is stored in memory 411. The central processing unit 409 converts the scanned 2D data to 3D voxel data and stores the results in another portion of the memory 411. Alternatively, the converted data may be directly sent to the interface unit 413 to be transferred to the virtual navigation terminal 416. The conversion of the 2D data could also take place at the virtual navigation terminal 416 after being transmitted from the interface 413. In the preferred embodiment, the converted data is transmitted over a carrier 414 to the virtual navigation terminal 416 in order for an operator to perform the virtual examination. The data may also be transported in other conventional ways, such as storing the data on a storage medium and physically transporting it to terminal 416 or by using satellite transmissions, for example.

The scanned data need not be converted to its 3D representation until the visualization-rendering engine requires it to be in 3D form. This saves computational steps and memory storage space.

Figure 9:
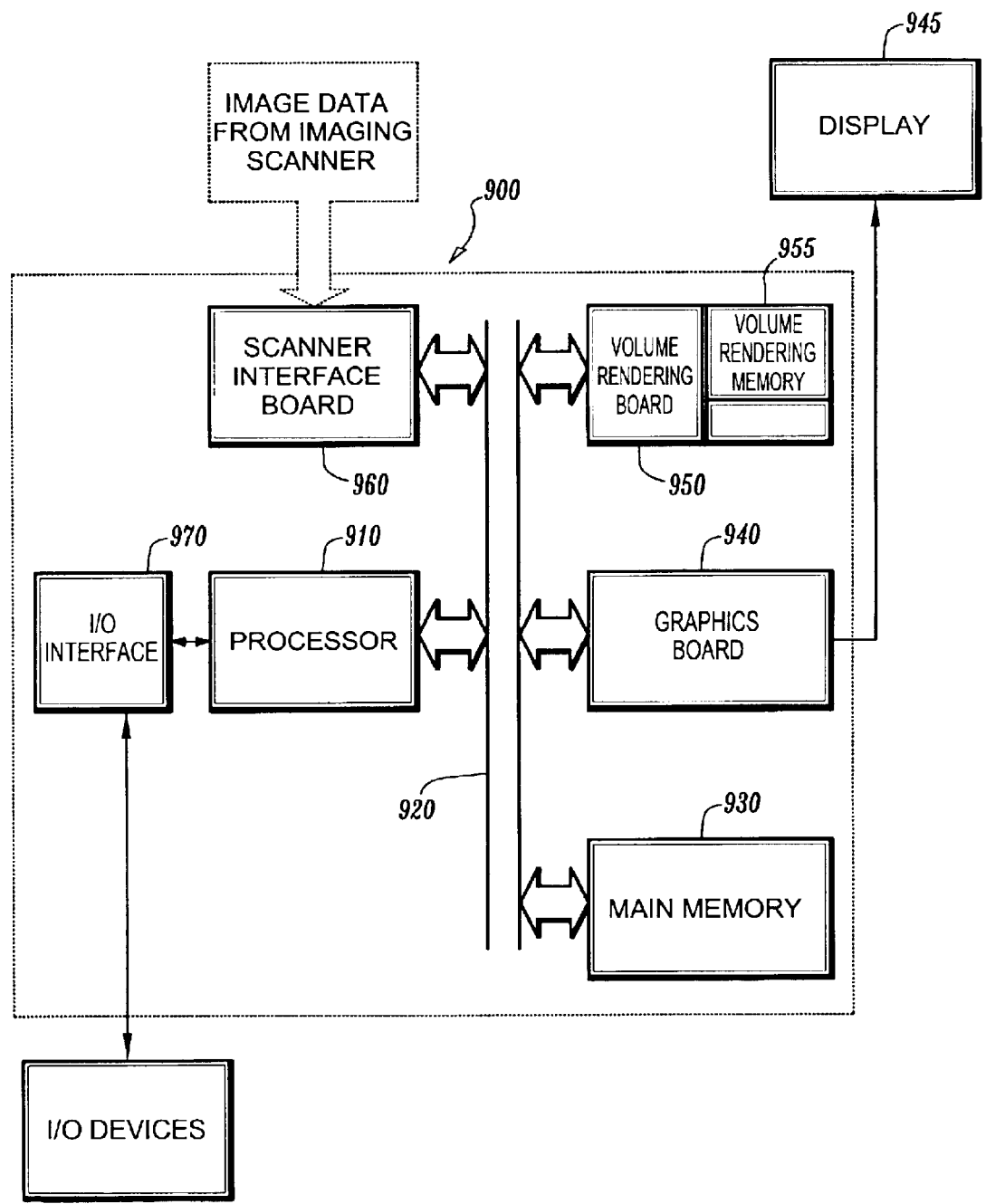
FIG. 9 shows a block diagram of a system embodiment based on a personal computer bus architecture.

The virtual navigation terminal 416 includes a screen for viewing the virtual organ or other scanned image, an electronics portion 415 and an interface control 419 such as a keyboard, mouse or spaceball. The electronics portion 415 includes an interface port 421, a central processing unit 423, optional components 427 for running the terminal and a memory 425. The components in the terminal 416 are connected together with conventional connectors. The converted voxel data is received in the interface port 421 and stored in the memory 425. The central processing unit 423 then assembles the 3D voxels into a virtual representation and runs the submarine camera model as described in FIGS. 2 and 3 to perform the virtual examination. As the submarine camera travels through the virtual organ, the visibility technique as described in FIG. 9 is used to compute only those areas that are visible from the virtual camera, and displays them on the screen 417. A graphics accelerator can also be used in generating the representations. The operator can use the interface device 419 to indicate which portion of the scanned body is desired to be explored. The interface device 419 can further be used to control and move the submarine camera as desired as detailed for FIG. 2. The terminal portion 415 can be, for example, the Cube-4 dedicated system box, generally available from the Department of Computer Science at the State University of New York at Stony Brook.

The scanning device 405 and terminal 416, or parts thereof, can be part of the same unit. A single platform would be used to receive the scan image data, connect it to 3D voxels if necessary and perform the guided navigation.

An important feature in system 400 is that the virtual organ can be examined at a later time without the presence of the patient. Additionally, the virtual examination could take place while the patient is being scanned. The scan data can also be sent to multiple terminals, which would allow more than one doctor to view the inside of the organ simultaneously. Thus a doctor in New York could be looking at the same portion of a patient's organ at the same time with a doctor in California while discussing the case. Alternatively, the data can be viewed at different times. Two or more doctors could perform their own examination of the same data in a difficult case. Multiple virtual navigation terminals could be used to view the same scan data. By reproducing the organ as a virtual organ with a discrete set of data, there are a multitude of benefits in areas such as accuracy, cost and possible data manipulations.

Some of the applicable techniques may be further enhanced in virtual colonoscopy applications through the use of a number of additional techniques that are described in U.S. Pat. No. 6,343,936 entitled "SYSTEM AND METHOD FOR PERFORMING A THREE-DIMENSIONAL VIRTUAL EXAMINATION, NAVIGATION AND VISUALIZATION" by Kaufman et al.; issued Feb. 7, 2002, which is incorporated herein by reference in its entirety. These improvements, described briefly below, include improved colon cleansing, volume rendering, additional fly-path determination techniques, and alternative hardware embodiments.

An improved electronic colon cleansing technique employs modified bowel preparation operations followed by image segmentation operations, such that fluid and stool remaining in the colon during a computed tomographic ("CT") or magnetic resonance imaging ("MRI") scan can be detected and removed from the virtual colonoscopy images. Through the use of such techniques, conventional physical washing of the colon, and its associated inconvenience and discomfort, is minimized or completely avoided.

In addition to image segmentation and texture mapping, volume-rendering techniques may be used in connection with virtual colonoscopy procedures to further enhance the fidelity of the resulting image. Methods for volume rendering are well known to those of ordinary skill in the pertinent art.

Figure 5:
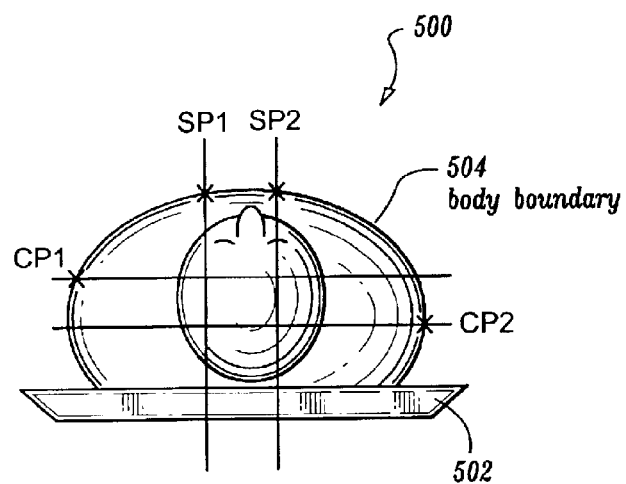
FIG. 5 illustrates imaginary planes used to define exemplary boundary profiles according to an embodiment of the present invention.

As shown in FIG. 5, a plot of imaginary planes used to define exemplary boundary profiles is indicated generally by the reference numeral 500. The plot 500, for example, depicts four imaginary planes that intersect a patient's body. There are two sagittal planes SP1 and SP2 and there are two corollary planes CP1 and CP2. Each of these planes intersects the boundary 504 of the patient's body and, at this intersection, creates a profile that can be analyzed. The sagittal profiles are more sensitive to breathing motion or superior-posterior movement of the abdomen, while the corollary profiles are more sensitive to body shift. Thus, in the exemplary embodiment of FIG. 5, four profiles are created using the four planes SP1, SP2, CP1, CP2.

The SP1 and SP2 planes each create a profile that has a top region distant from the table 502 and a bottom region proximate the table 502. As the table 502 is assumed not to move, and the patient's movement against the table 502 is minimal, only the top region of each of the sagittal profiles is analyzed. The corollary profiles have a left region and a right region representing the left and right sides of the patient's body. According to one embodiment of the present invention, one corollary profile (e.g., from CP1) is used to analyze the left boundary while the other corollary profile (e.g., from CP2) is used to analyze the right boundary.

Figure 6:
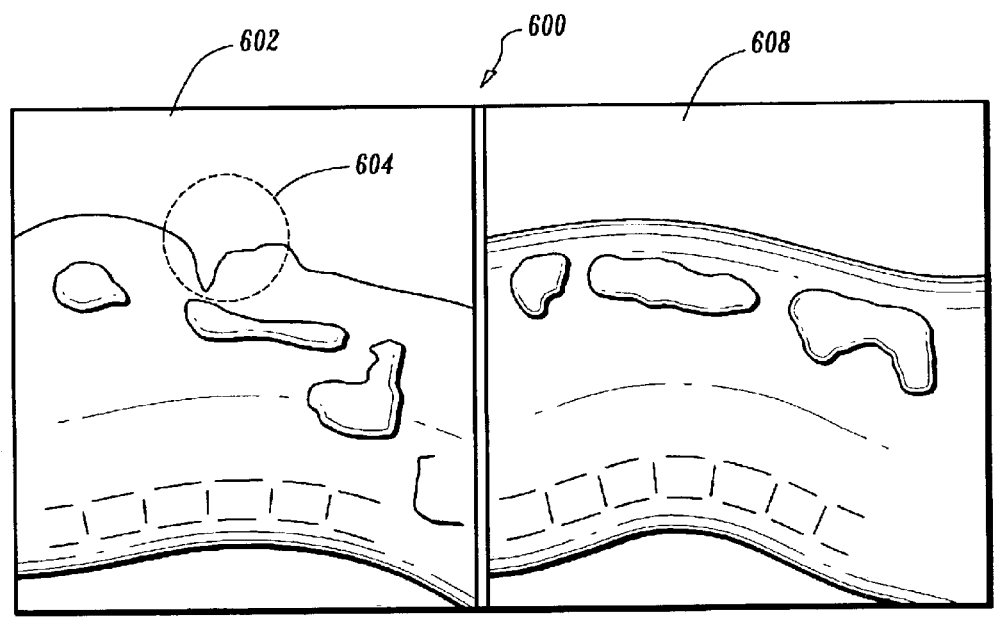
FIG. 6 illustrates exemplary profiles that depict the presence or absence of motion artifacts.

Turning to FIG. 6, a plot of exemplary profiles that depict the presence or absence of motion artifacts is indicated generally by the reference numeral 600. The plot 600 illustrates exemplary profiles created from an intersecting sagittal plane. The frame on the left 602 shows breath motion visible in the abdomen contour 604; while the frame on the right 608 shows no motion artifact.

Figure 7:
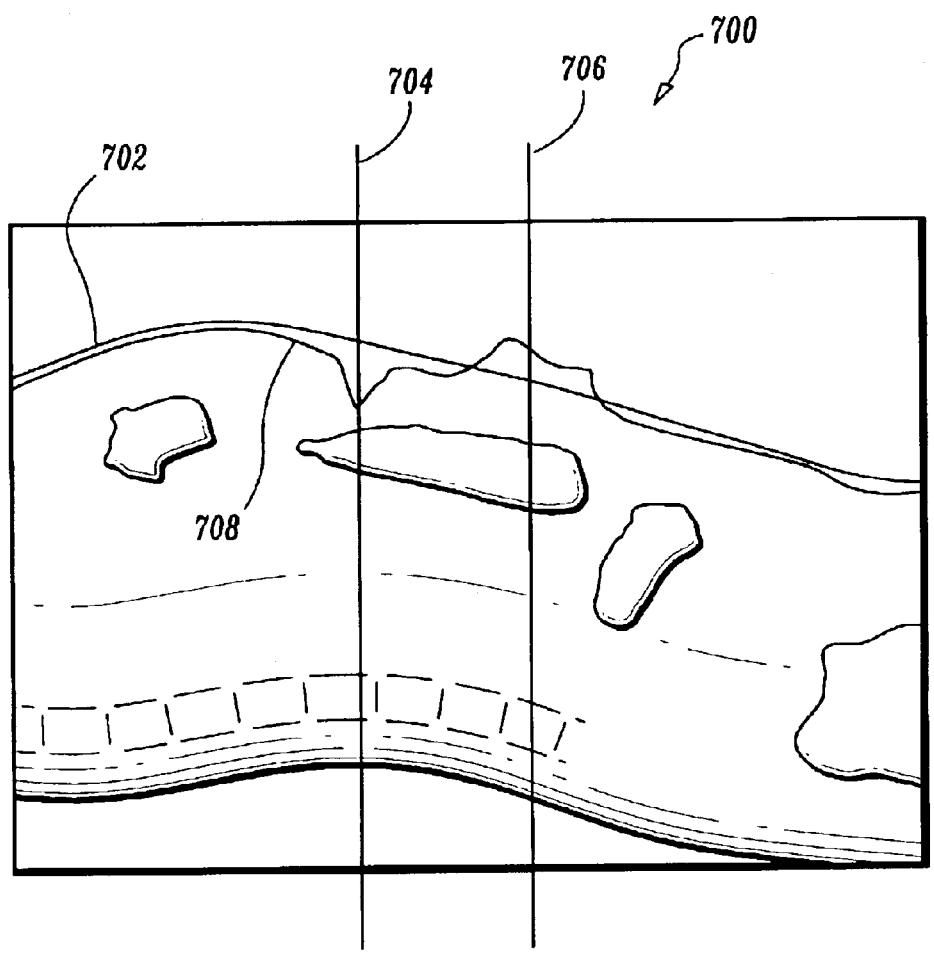
FIG. 7 illustrates motion artifact regions in a boundary profile that can be corrected according to an embodiment of the present invention.

Turning now to FIG. 7, a plot of correctable motion artifact regions in a boundary profile is indicated generally by the reference numeral 700. The plot 700 illustrates an exemplary method for correcting for motion artifacts. In this figure, a smooth abdomen curve 702 is fit to the top of the abdomen profile 708 that shows breathing motion. The imaginary abdomen curve 702 is considered "smooth" because it is calculated to have a roughness measure less than the predetermined threshold. The vertical lines 704 and 706 in FIG. 7 represent axial planes that intersect the abdomen profile or contour 708. These axial planes correspond to two-dimensional scan images that were acquired during scanning of the patient. Correction for motion artifacts is performed by comparing each axial plane in the scanned profile 708 with the calculated smooth contour 702 and then adjusting the pixel data in each axial plane based on the comparison. More particularly, for each axial plane, the difference between the smooth curve 702 and the actual abdomen boundary 708 is utilized to adjust the axial plane to remove the motion artifact. The adjustment can be done using conventional image manipulation and transformation techniques to accomplish stretching, shifting, shrinking or some other transformation.

For example, the left vertical line 704 represents an axial plane that needs to be transformed upwards to match with the smooth abdomen curve 702. The right vertical line 706 represents an axial plane that would need to be transformed downwards to align with the smooth abdomen curve 702.

In the example of FIG. 7, since the scan is of the abdomen and the patient is lying on a fixed table, an interpolation in the vertical direction (for all pixels in the axial plane) can be performed in which the bottom of the plane is not transformed at all while the top of the plane is adjusted so that the boundary 708 aligns with the smooth curve 702. Between these two points, the adjustment percent can be interpolated between "no transformation" at the bottom and the "full amount" required at the top. This interpolation can be linear, some higher order, or some continuous smooth operation. Alternatively, in an example without the fixed table, the transformation of the axial plane could include nearly zero adjustment at the center of the axial plane and substantially similar stretching (or shrinking) at top and bottom edges of the axial plane. Additionally, the interpolation can even take into account the density of the CT scan to adjust the amount of possible stretching or shrinking possible for a particular axial plane.

Once the axial planes have been corrected, the volume elements can be recalculated using the corrected scan data. While an example of only a sagittal boundary for an abdomen scan has been explicitly provided, embodiments of the present invention contemplate detecting and correcting for motion artifacts related to other regions and objects of a patient and other plane profiles (e.g., corollary).

Figure 8:
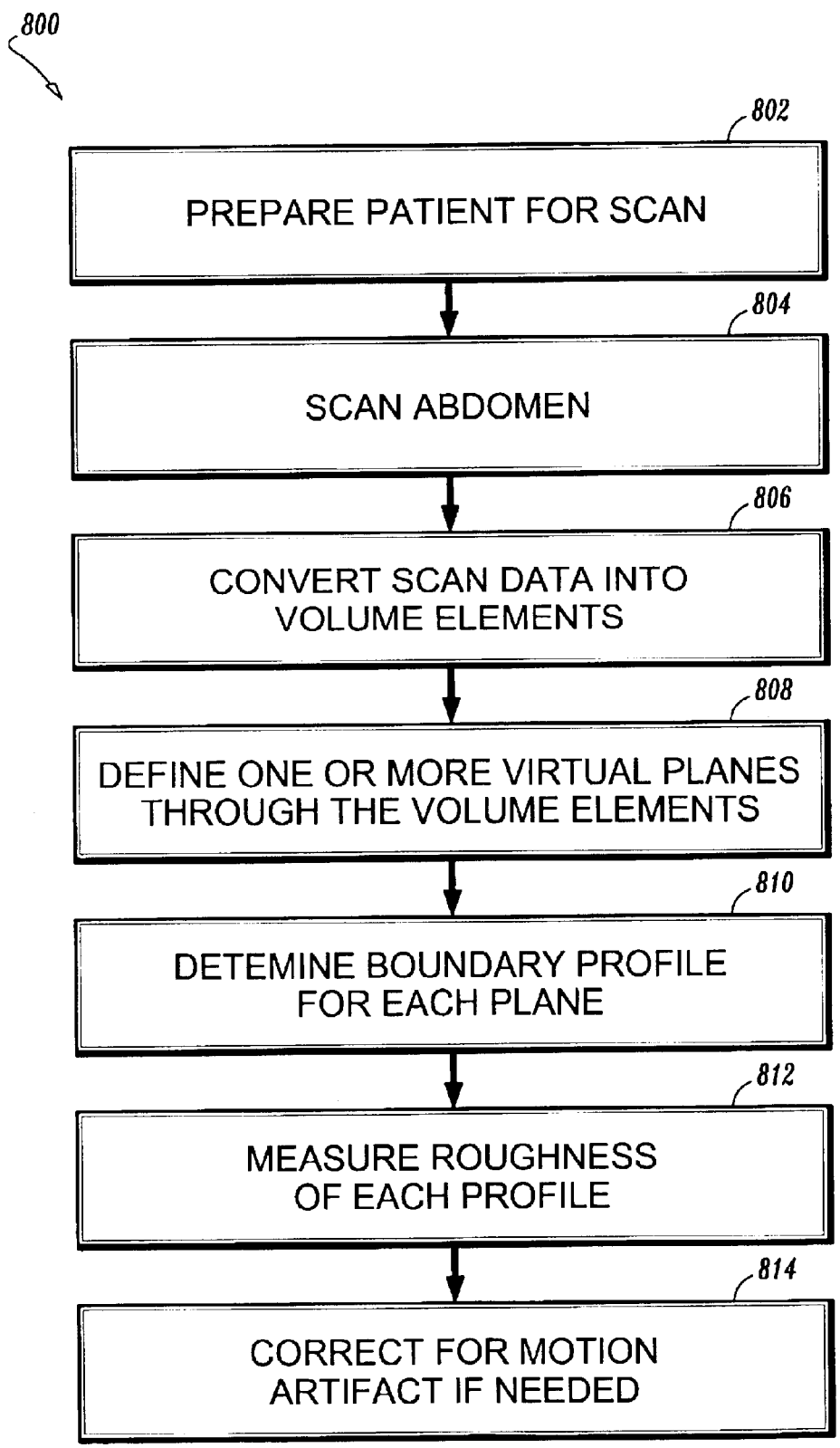
FIG. 8 depicts a flowchart for detecting and correcting motion artifacts according to an embodiment of the present invention.

Referring to FIG. 8, a method for detecting and correcting motion artifacts is indicated generally by the reference numeral 800. The method 800 is for detecting and correcting motion artifacts according to an embodiment of the present invention. According to the flowchart, the first steps are the initial steps of performing any scan such as, for example, for a virtual colonoscopy or other virtual examination. In step 802, the patient is prepared for the scan in a manner appropriate for the scanning technology. Next, in step 804, the patient is scanned to acquire the multiple individual two-dimensional slices of the region, or object, of interest. For example, the scan could be a CT scan of the abdomen for the purposes of performing a virtual colonoscopy. Next, in step 806, the scan data is converted into volume elements according to conventional methods described previously.

Once the volume elements are available for analysis, they can be used to help detect if a motion artifact exists within the scan data. In step 808, one or more virtual planes are defined which intersect the patient and the object of interest.

For each profile, the contour of the body's boundary 504 can be obtained by conventional thresholding techniques applied, in step 810, to the volume data intersected by the plane (e.g., SP1, SP2, CP1, CP2) used to create the profile. The body's boundary 504 usually has a sharp intensity slope compared to the background of the scan and, thus, each profile can be readily determined. If necessary, more advanced region-growing techniques can be employed to remove the background and delineate the body contour. After obtaining each profile or contour, the roughness of the profile is measured in step 812. If the boundary of an object is smooth, such as a patient's body contour 504, then the profile of the boundary of CT images should also be smooth. When the boundary, however, is blurred such as by movement of the patient, then the profile is no longer smooth. By detecting the roughness of the boundary profile, the existence of motion artifacts in CT images, and other scanning technologies, can be detected. One exemplary measurement of roughness is to use first order derivatives. According to this exemplary method, the first order derivatives are calculated along the profile. Specifically, for each unit step in the horizontal direction, the change in the vertical direction is determined along the profile. If the amplitude (either positive or negative) of the first order derivative is greater than a predetermined threshold, then a motion artifact is detected.

There are other alternatives to first-order derivative measurements, such as, for example, fractal-based roughness measurements. Also, the pre-set threshold depends on the feature being analyzed, the scale of the images, and the scan technology being used. It is an empirical value that is application driven.

In step 812, the roughness is calculated individually for each profile. If there is at least one profile in which the roughness is larger than the pre-set threshold, then patient movement during the scan is detected. Knowing that movement occurred can prevent wasting time and effort analyzing data that includes a motion artifact. In addition, or alternatively, the motion artifact can be corrected for, in step 814.

Detecting and Correcting for Movement in CT Scanning

Turning to FIG. 9, a system embodiment based on a personal computer bus architecture is indicated generally by the reference numeral 900. The system 900 includes an alternate hardware embodiment suitable for deployment on a personal computer ("PC"), as illustrated. The system 900 includes a processor 910 that preferably takes the form of a high speed, multitasking processor, such as, for example, a Pentium III processor operating at a clock speed in excess of 400 MHZ. The processor 910 is coupled to a conventional bus structure 920 that provides for high-speed parallel data transfer. Also coupled to the bus structure 920 are a main memory 930, a graphics board 940, and a volume rendering board 950. The graphics board 940 is preferably one that can perform texture mapping, such as, for example, a Diamond Viper v770 Ultra board manufactured by Diamond Multimedia Systems. The volume rendering board 950 can take the form of the VolumePro board from Mitsubishi Electric, for example, which is based on U.S. Pat. Nos. 5,760,781 and 5,847,711, which are hereby incorporated by reference in their entirety. A display device 945, such as a conventional SVGA or RGB monitor, is operably coupled to the graphics board 940 for displaying the image data. A scanner interface board 960 is also provided for receiving data from an imaging scanner, such as an MRI or CT scanner, for example, and transmitting such data to the bus structure 920. The scanner interface board 960 may be an application specific interface product for a selected imaging scanner or can take the form of a general-purpose input/output card. The PC based system 900 will generally include an I/O interface 970 for coupling I/O devices 980, such as a keyboard, digital pointer or mouse, and the like, to the processor 910. Alternatively, the I/O interface can be coupled to the processor 910 via the bus 920.

Embodiments of the present disclosure provide a user interface displaying both two-dimensional and three-dimensional data. Organs within the body are, by nature, three-dimensional. Conventional medical imaging devices, however, as explained herein, create stacks of two-dimensional images when acquiring scan data. Radiologists and other specialists, therefore, have historically been trained to review and analyze these two-dimensional images. As a result, most doctors are comfortable viewing two-dimensional images even if three-dimensional reconstructions or virtualizations are available.

However, many organs are not simple convex objects but, instead, can be tortuous or have many branches. While a doctor may be comfortable analyzing two-dimensional images, performing navigation through complex organs is very difficult using merely two-dimensional images. Navigating using the two-dimensional images would include manually scrolling through the images to move in the "z" direction (along the major axis of the body) and panning the images to move in the "x" and "y" direction. In this manner an operator can traverse the organ looking for areas of interest.

On the other hand, three-dimensional flight paths, as described herein, are intuitive, efficient tools to virtually travel through volumetric renderings of human organs either automatically or manually. During a flight path tour, each point along the flight path is represented by a coordinate (x, y, z). According to embodiments of the present disclosure, these coordinates are used to automatically scroll and pan the series of two-dimensional images that doctors are used to analyzing. Thus, the operator does not have to manually navigate through an organ in two dimensions but, instead, can let the present virtualization system advance along the organ while the operator concentrates on analyzing each two-dimensional image.

Although the scanning speed of modern MRI and other such equipment is a vast improvement over earlier technologies, it remains slow enough that patient movement during a scan can cause blurring of boundary formed by the tissue of the patient and the background of the scanning equipment. This blurring is usually referred to as "motion artifact". Thus, a scanning system and method that can detect and correct for motion artifacts has been disclosed herein.

In the exemplary environment of abdominal CT scans, the causes of motion artifacts include breathing, body rotation and body shifts. Breathing usually causes the superior-posterior movement of the abdomen and body shift causes left-right movement of the body.

Embodiments of the present invention use a virtual plane to bisect the scanned object (e.g., a patient's abdomen) to get a profile of the boundary of that object. The smoothness or roughness of the boundary between the object's profile and the background is measured and used to determine whether a motion artifact exists in the CT data or other types of images.

The foregoing merely illustrates the principles of the disclosure. It will thus be appreciated that those skilled in the art will be able to devise numerous systems, apparatus and methods which, although not explicitly shown or described herein, embody the principles of the disclosure and are thus within the spirit and scope of the disclosure as defined by its claims.

For example, the methods and systems described herein could be applied to virtually examine an animal, fish or inanimate object. Besides the stated uses in the medical field, applications of the technique could be used to detect the contents of sealed objects that cannot be opened. The technique could also be used inside an architectural structure such as a building or cavern and enable the operator to navigate through the structure.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which embodiments of the present disclosure are programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present disclosure. All such changes and modifications are intended to be included within the scope of the present invention as set forth in the appended claims.

What is claimed is:

1. A method for detecting motion artifacts within scan data of a region comprising an object, the method comprising: creating a three-dimensional representation comprising volume elements of the region based on the scan data;
   analyzing a plurality of the volume elements along a boundary of the object;
   determining a contour of the boundary within the three-dimensional representation;
   measuring a roughness of the contour; and
   determining the existence of at least one motion artifact in response to the analyzing if the roughness of the contour exceeds predetermined threshold.

2. A method as defined in claim 1, further comprising correcting the scan data to remove the at least one motion artifact.

3. A method as defined in claim 1, further comprising:
   repeating, for each of a plurality of boundaries of the object, the steps of determining a contour and measuring a roughness; and
   determining that a motion artifact exists if the roughness of any contour exceeds a predetermined threshold.

4. A method as defined in claim 1, wherein analyzing comprises:
   defining a plane intersecting the boundary of within the three-dimensional representation of the region; and
   identifying a contour of the boundary coinciding with the defined plane.

5. A method as defined in claim 4, further comprising:
   repeating, for each of a plurality of planes, the steps of defining a plane, identifying a contour and measuring a roughness; and
   determining that a motion artifact exists if the roughness of the identified contour exceeds a predetermined threshold.

6. A method as defined in claim 5 wherein the plurality of planes comprises a first pair of parallel planes and a second pair of parallel planes, said second pair orthogonal to said first pair.

7. A method as defined in claim 1 wherein the at least one motion artifact reflects motion of the object in at least one of the vertical and horizontal directions.

8. A method as defined in claim 4 wherein the step of identifying a contour of the boundary is performed using thresholding techniques to distinguish the object from a region background.

9. A method as defined in claim 4 wherein the step of measuring roughness comprises calculating a magnitude of the first derivative at intervals along the contour.

10. A method as defined in claim 4 the step of correcting comprises:
    calculating a smooth contour based on the identified contour; and
    transforming the identified contour to align with the smooth contour.

11. A method as defined in claim 10, further comprising:
    identifying one or more regions of the identified contour that do not align with the smooth contour, each of said regions having an associated axial plane orthogonally intersecting the defined plane;
    for each such identified region, calculating a respective transformation to align the identified contour with the smooth contour; and
    correcting the scan data within each said axial plane according to the respective transformation.

12. A method as defined in claim 1 wherein said scan data is from a radiological scanning device.

13. A method as defined in claim 1 wherein said object is disposed in a human abdomen.

14. A method as defined in claim 13 further comprising:
    intersecting the three-dimensional representation with a corollary plane, thereby creating a first profile of the abdomen within a background of the field of view; and
    intersecting the three-dimensional representation with a sagittal plane, thereby creating a second profile of the abdomen within a background of the field of view.

15. A method as defined in claim 14, further comprising:
    thresholding the first profile to identify a corollary contour of the abdomen; and
    thresholding the second profile to identify a sagittal contour of the abdomen.

16. A method as defined in claim 15 wherein the sagittal contour reveals any breathing motion of the abdomen and the corollary contour reveals any body-shift of the abdomen.

17. A method as defined in claim 15, further comprising:
    calculating a first roughness measure of the corollary contour;
    calculating a second roughness measure of the sagittal contour; and
    determining that a motion artifact exists if either roughness measure exceeds a respective threshold.

18. A method as defined in claim 17 wherein each of the first and second roughness measures is calculated, at points corresponding to each of the axial planes representing slices of the abdomen, by calculating the magnitude of the first derivative along the respective contour.

19. A method as defined in claim 18, further comprising:
    calculating a smooth sagittal contour;
    identifying a set of points on the sagittal contour that do not align with the smooth sagittal contour;
    determining at a plurality of points of the set of points a respective transformation to align the sagittal contour with the smooth sagittal contour; and
    for the axial plane corresponding to the plurality of points of the set of points, transforming scan data within that axial plane based on the determined respective transformation.

20. A method as defined in claim 18, further comprising:
    calculating a smooth corollary contour;
    identifying a set of points on the corollary contour that do not align with the smooth corollary contour;
    determining at a plurality of points of the set of points a respective transformation to align the corollary contour with the smooth corollary contour; and
    for the axial plane corresponding to the plurality of points of the set of points, transforming scan data within that axial plane based on the determined respective transformation.

21. A method for performing a three-dimensional virtual examination of at least one object, the method comprising:

scanning with a scanning device to produce scan data representative of said at least one object;

creating a three-dimensional volume representation of said at least one object comprising volume elements from said scan data;

determining at least one boundary contour of the at least one object within the three-dimensional representation;

measuring a roughness of the at least one contour;

correcting for least one motion artifacts within said three-dimensional volume representation if the roughness of the at least one contour exceeds a predetermined threshold.

22. A method as defined in claim 21 wherein said object is elongated, the method further comprising:

selecting at least one end volume element from about one end of said corrected three-dimensional volume representation;

generating a defined path from said end volume element extending to about the other end of said corrected three-dimensional volume representation;

performing a guided navigation of said corrected three-dimensional representation along said path; and displaying in real time said volume elements responsive to said path.

23. A method as defined in claim 22, wherein said displayed volume elements are further responsive to an operator's input during said guided navigation.

24. A method as defined in claim 21 wherein correcting for one or more motion artifacts comprises:

detecting the one or more motion artifacts within the three-dimensional volume representation;

editing the scan data based on the detected one or more motion artifacts; and creating a corrected three-dimensional volume representation of said object from the edited scan data.

25. A method as defined in claim 21 wherein the object is an organ within a body.

26. A method as defined in claim 25 wherein the organ is a colon.

27. A method as defined in claim 25 wherein the organ is a lung.

28. A method as defined in claim 25 wherein the organ is a heart.

29. An apparatus for performing a three-dimensional virtual examination of at least one object, the apparatus comprising:

scanning means for scanning with a scanning device and producing scan data representative of said object, said scan data comprising a sequence of two-dimensional images of said object;

volume-rendering means for creating a three-dimensional volume representation of said object comprising volume elements from said scan data; and detection means for determining a boundary contour of said object within said three-dimensional volume representation, measuring a roughness of the contour, and detecting a motion artifact within said representation if the roughness of the contour exceeds a predetermined threshold; and correction means for correcting for one or more motion artifacts within said three-dimensional volume representation.

30. A program storage device readable by machine, tangibly embodying a program of instructions executable by the machine to perform method steps for detecting motion artifacts within scan data of a region comprising an object, the steps comprising:

creating a three-dimensional representation comprising volume elements of the region based on the scan data;

analyzing a plurality of the volume elements along a boundary of the object;

determining a contour of the boundary of the object within the three-dimensional representation;

measuring a roughness of the contour; and determining the existence of at least one motion artifact if the roughness of the contour exceeds a predetermined threshold.

31. A program storage device as defined in claim 30, the steps further comprising correcting the scan data to remove the at least one motion artifact.

32. An apparatus as defined in claim 29, further comprising:

selection means for selecting at least one end volume element from said three-dimensional volume representation;

flight-path means for generating a defined path including said end volume element along said three-dimensional volume representation;

navigational means for performing a guided navigation of said three-dimensional representation along said path; and display means for displaying in real time said volume elements responsive to said path and to an operator's input during said guided navigation and simultaneously displaying at least one of the sequence of two-dimensional images based on a current location along the defined path.

33. An apparatus for performing a three-dimensional virtual examination of at least one object the apparatus comprising:

a scanning device for receiving a plurality of two-dimensional image slices of at least one object;

a rendering device in signal communication with the scanning device for rendering a three-dimensional volume representation of the plurality of two-dimensional image slices;

a correction device in signal communication with the rendering device for correcting for one or more motion artifacts within said three-dimensional volume representation;

a processing device in signal communication with the correction device for locating a first set of features along a centerline within the rendered three-dimensional volume representation;

an indexing device in signal communication with the processing device for matching at least one feature in the rendered three-dimensional volume representation with a corresponding two-dimensional image slice; and a display device in signal communication with the indexing device for displaying both of the rendered three-dimensional volume representation and the matched two dimensional image slice.

* * * * *